March 25, 1969  W. H. GRANT, JR  3,434,741
TRAILER HITCH LOCK
Filed Jan. 24, 1967
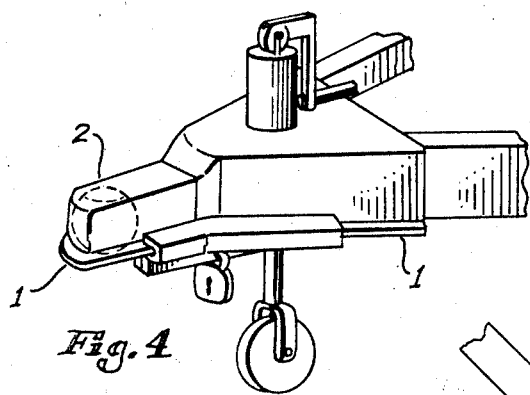
Fig. 4
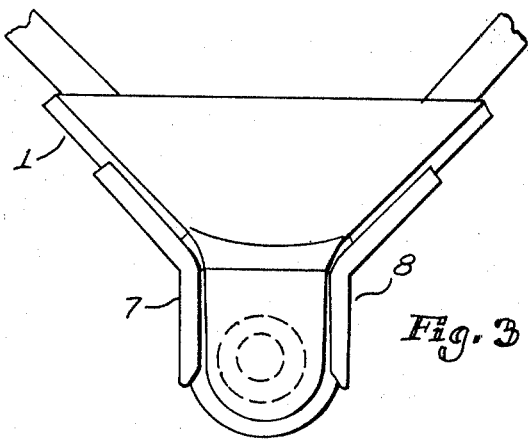
Fig. 3
Fig. 2
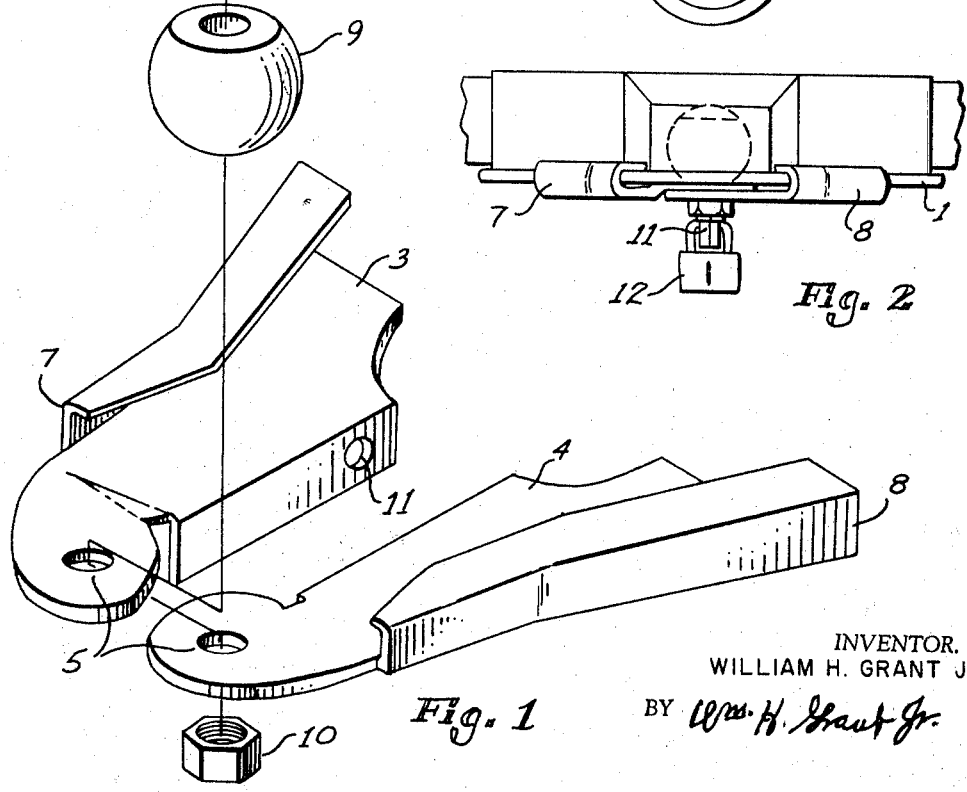
Fig. 1
INVENTOR.
WILLIAM H. GRANT JR.
BY *Wm. H. Grant Jr.*
ATTORNEYS

United States Patent Office 3,434,741
Patented Mar. 25, 1969

3,434,741
TRAILER HITCH LOCK
William Henry Grant, Jr., 2202 Grove St.,
Boulder, Colo. 80302
Filed Jan. 24, 1967, Ser. No. 611,376
Int. Cl. B60d *1/06, 1/16*
U.S. Cl. 280—507     1 Claim This invention relates to a trailer hitch anti-theft device which renders said socket hitch inoperative for unauthorized connection to the ball hitch of a draft vehicle.

The principal object of this invention is to provide an anti-theft device for use on all types of trailer socket hitches that incorporate a lateral bottom flange such that, when locked onto the side portion of said flange, will prevent unauthorized persons from connecting said socket hitch to the ball hitch of a draft vehicle while the trailer is parked.

A further object of this invention is to provide an anti-theft device that is of simple construction, easy to use and manufacture, but rugged enough that it is not easily pried off, broken or in any other way simple to remove by unauthorized persons.

A final object of this invention is to provide an anti-theft device that does not require in any way a modification, by drilling or any other manner, of the trailer socket hitch that it works in combination with; but uses the lateral bottom flange as more fully hereinafter described and claimed, referenced by the accompanying drawings forming a part hereof.

FIGURE 1 is an exploded perspective view of the anti-theft device.

FIGURE 2 is a front view of the anti-theft device on a trailer socket hitch.

FIGURE 3 is a top view of FIGURE 2.

FIGURE 4 is a perspective view of the anti-theft device mounted on the trailer hitch.

Referring now more particularly to the accompanying drawings FIGURE 4 shows the perspective view of a trailer hitch showing the lateral bottom flange 1 extending around the lower edge of ball socket portion 2. Normally the ball of a ball hitch is inserted in the ball socket 2 for drawing the connected trailer.

To prevent the use of said socket hitch, two symmetrical flat plates 3 and 4, reference FIGURE 1, hinged at hole 5 by ball pin 6, having curved sections 7, 8 designed in such a way as to receive the side portion of the lateral flange 1 of the socket hitch and with a regular hitch ball 9 fastened on the plates by ball pin 6 through holes 5 and held in place by nut 10, were designed.

With the hinged plates 3 and 4 in the open position ball 9 is inserted into the ball socket 2 of a trailer hitch. The hinged plates 3 and 4 are brought together until curved sections 7 and 8 receive the side portions of flange 1 as shown in position in FIGURE 2. Some locking device as a padlock 12 or bolt and bolt head lock can be inserted through hole 11 locking the anti-theft device in place. The ball is now securely fastened into position keeping unauthorized persons from coupling a draft vehicle with a ball hitch to said trailer.

The foregoing is considered as illustrative only of the operation of said anti-theft device. The present device is capable of modification and such changes thereto as come within the scope of the claims is deemed part of the invention.

What is claimed as new follows:

1. A ball and socket hitch having trailer anti-theft means comprising; a socket member, side flanges on said socket member, a ball member, a pair of plates, each plate having a channel shaped portion to receive one of said side flanges, means mounting each of said plates for movement relative to said ball member, and locking means to prevent said relative movement when said plates are in flange receiving position.

References Cited

UNITED STATES PATENTS

| 3,226,133 | 12/1965 | Geresy | 280—507 |
| 3,233,913 | 2/1966 | Brown | 280—507 |
| 3,237,969 | 3/1966 | Geresy | 280—507 |

FOREIGN PATENTS

| 992,133 | 5/1965 | Great Britain. |

BENJAMIN HERSH, *Primary Examiner.*

J. SIEGEL, *Assistant Examiner.*

U.S. Cl. X.R.

280—511